US010021039B2

(12) United States Patent
Morita et al.

(10) Patent No.: US 10,021,039 B2
(45) Date of Patent: Jul. 10, 2018

(54) MOBILE COMMUNICATION SYSTEM AND USER TERMINAL

(71) Applicant: KYOCERA CORPORATION, Kyoto (JP)

(72) Inventors: Kugo Morita, Yokohama (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/699,970

(22) Filed: Apr. 29, 2015

(65) Prior Publication Data
US 2015/0244641 A1 Aug. 27, 2015

Related U.S. Application Data

(63) Continuation of application No. 14/405,465, filed as application No. PCT/JP2013/065748 on Jun. 6, 2013.

(60) Provisional application No. 61/656,194, filed on Jun. 6, 2012, provisional application No. 61/693,993, filed on Aug. 28, 2012.

(51) Int. Cl.
| H04L 12/911 | (2013.01) |
| H04W 76/04 | (2009.01) |
| H04L 5/00 | (2006.01) |
| H04W 72/04 | (2009.01) |
| H04W 76/23 | (2018.01) |

(Continued)

(52) U.S. Cl.
CPC .......... H04L 47/746 (2013.01); H04L 5/0055 (2013.01); H04W 72/0446 (2013.01); H04W 72/0453 (2013.01); H04W 76/14 (2018.02); H04W 76/23 (2018.02); H04W 8/005 (2013.01)

(58) Field of Classification Search
CPC .......... H04W 76/023; H04W 72/0453; H04W 76/043; H04W 72/0446; H04W 8/005; H04L 5/0055; H04L 47/746
See application file for complete search history.

(56) References Cited

U.S. PATENT DOCUMENTS

2004/0192391 A1 9/2004 Nagai
2012/0129540 A1 5/2012 Hakola et al.
(Continued)

FOREIGN PATENT DOCUMENTS

JP H07-087009 A 3/1995
JP 2001-238264 A 8/2001
(Continued)

OTHER PUBLICATIONS

International Search Report; PCT/JP2013/065748; dated Aug. 13, 2013.
(Continued)

Primary Examiner — Gbemileke J Onamuti
(74) Attorney, Agent, or Firm — Studebaker & Brackett PC

(57) ABSTRACT

In a mobile communication system comprising a first user terminal and a second user terminal, D2D communication is radio communication directly performed between the first user terminal and the second user terminal in a frequency and a time assigned from a base station. In a time in which data is to be received from the first user terminal, when the second user terminal does not receive the data from the first user terminal, the second user terminal transmits failure notification indicating reception failure in the D2D communication to the base station.

12 Claims, 16 Drawing Sheets

(51) Int. Cl.
*H04W 76/14* (2018.01)
*H04W 8/00* (2009.01)

(56) References Cited

U.S. PATENT DOCUMENTS

| | | | | |
|---|---|---|---|---|
| 2013/0223356 | A1* | 8/2013 | Khoshnevis | H04W 72/042 370/329 |
| 2013/0322413 | A1* | 12/2013 | Pelletier | H04W 72/1289 370/336 |
| 2014/0057670 | A1* | 2/2014 | Lim | H04W 8/005 455/509 |
| 2014/0153390 | A1* | 6/2014 | Ishii | H04W 76/023 370/230 |

FOREIGN PATENT DOCUMENTS

| | | |
|---|---|---|
| JP | 2002-27535 A | 1/2002 |
| JP | 2004-297218 A | 10/2004 |
| JP | 2010-171662 A | 8/2010 |
| JP | 2010-187316 A | 8/2010 |
| JP | 2010-219886 A | 9/2010 |
| WO | 2011/116017 A1 | 9/2011 |
| WO | 2011/147468 A1 | 12/2011 |
| WO | 2012/048464 A1 | 4/2012 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12); pp. 1-24.

An Office Action issued by the Japanese Patent Office dated Jan. 24, 2017, which corresponds to Japanese Patent Application No. 2016-199735 and is related to U.S. Appl. No. 14/699,970; with concise statement of relevance; 3pp.

Communication pursuant to Article 94(3) EPC issued by the European Patent Office dated Jul. 28, 2017, which corresponds to European Patent Application No. 13800166.4-1505 and is related to U.S. Appl. No. 14/699,970.

Lei Lei et al.; "Operator controlled device-to-device communications in LTE-advanced networks"; IEEE Wireless Communications; Jun. 2012; pp. 96-104; vol.19; No. 3; IEEE.

An Office Action issued by the Japanese Patent Office dated Jun. 6, 2017, which corresponds to Japanese Patent Application No. 2016-199735 and is related to U.S. Appl. No. 14/699,970; with concise statement of relevance; 4pp.

An Office Action issued by the Japanese Patent Office dated Oct. 31, 2017, which corresponds to Japanese Patent Application No. 2016-199735 and is related to U.S. Appl. No. 14/699,970; with English language Concise Explanation.

* cited by examiner

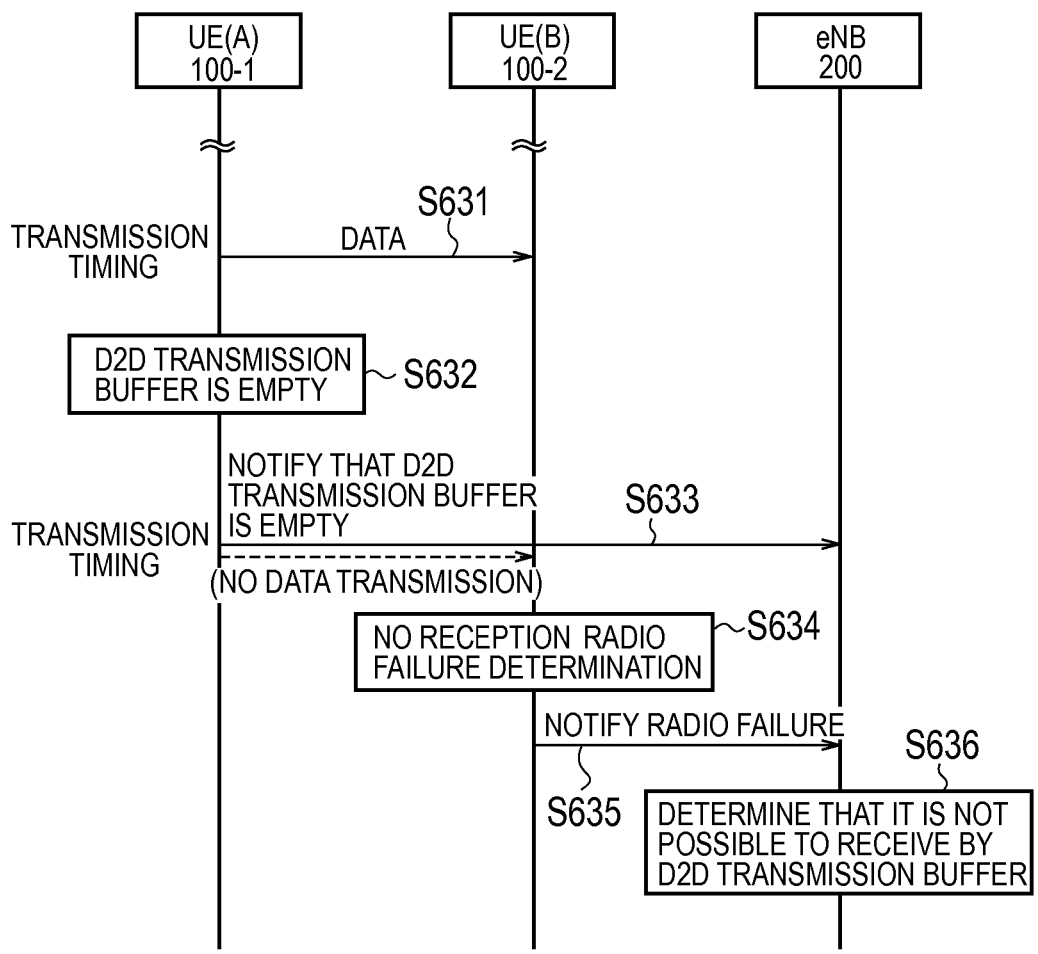

MOBILE COMMUNICATION SYSTEM AND USER TERMINAL

TECHNICAL FIELD

The present disclosure relates to a mobile communication system and a user terminal, which are used in a mobile communication system supporting D2D communication.

BACKGROUND ART

In 3GPP (3rd Generation Partnership Project) which is a project aiming to standardize a mobile communication system, the introduction of Device to Device (D2D) communication is discussed as a new function after release 12 (see Non-Patent Document 1).

In the D2D communication, a plurality of user terminals proximal to one another are able to perform direct communication with each other in the state where a radio connection with a network is established (in the state where synchronization is achieved). In addition, the D2D communication is also called Proximity Service communication.

PRIOR ART DOCUMENT

Non-Patent Document

Non-Patent Document 1: 3GPP technical report "TR 22.803 V0.3.0" May 2012

SUMMARY OF THE DISCLOSURE

However, the current 3GPP standards do not define specifications for appropriately controlling the D2D communication. Thus, there is a problem that the D2D communication and the cellular communication (radio communication between a user terminal and a base station) are difficult to be compatible with each other.

Therefore, the present disclosure is to provide a mobile communication system and a user terminal, with which it is possible to appropriately control D2D communication.

According to an embodiment, in a mobile communication system comprising a first user terminal and a second user terminal, D2D communication is radio communication directly performed between the first user terminal and the second user terminal in a frequency and a time assigned from a base station. In a time in which data is to be received from the first user terminal, when the second user terminal does not receive the data from the first user terminal, the second user terminal transmits failure notification indicating reception failure in the D2D communication to the base station.

According to an embodiment, a user terminal that performs D2D communication in which radio communication is directly performed with another user terminal in a frequency and a time assigned from a base station, comprises a notification transmission unit that transmits failure notification indicating reception failure in the D2D communication to the base station when data is not received from the other user terminal in a time in which the data is to be received from the other user terminal.

According to an embodiment, a user terminal that performs D2D communication in which radio communication is directly performed with another user terminal in a frequency and a time assigned from a base station, comprises a data transmission unit that transmits predetermined data to the second user terminal when there is no data to be transmitted to the second user terminal in a time in which the data is to be transmitted to the second user terminal.

BRIEF DESCRIPTION OF THE DRAWINGS

FIG. 20 is a sequence diagram of the operation pattern 2 of the interference avoidance operation according to the embodiment.

DESCRIPTION OF THE EMBODIMENT

Overview of Embodiment

Figure 1:
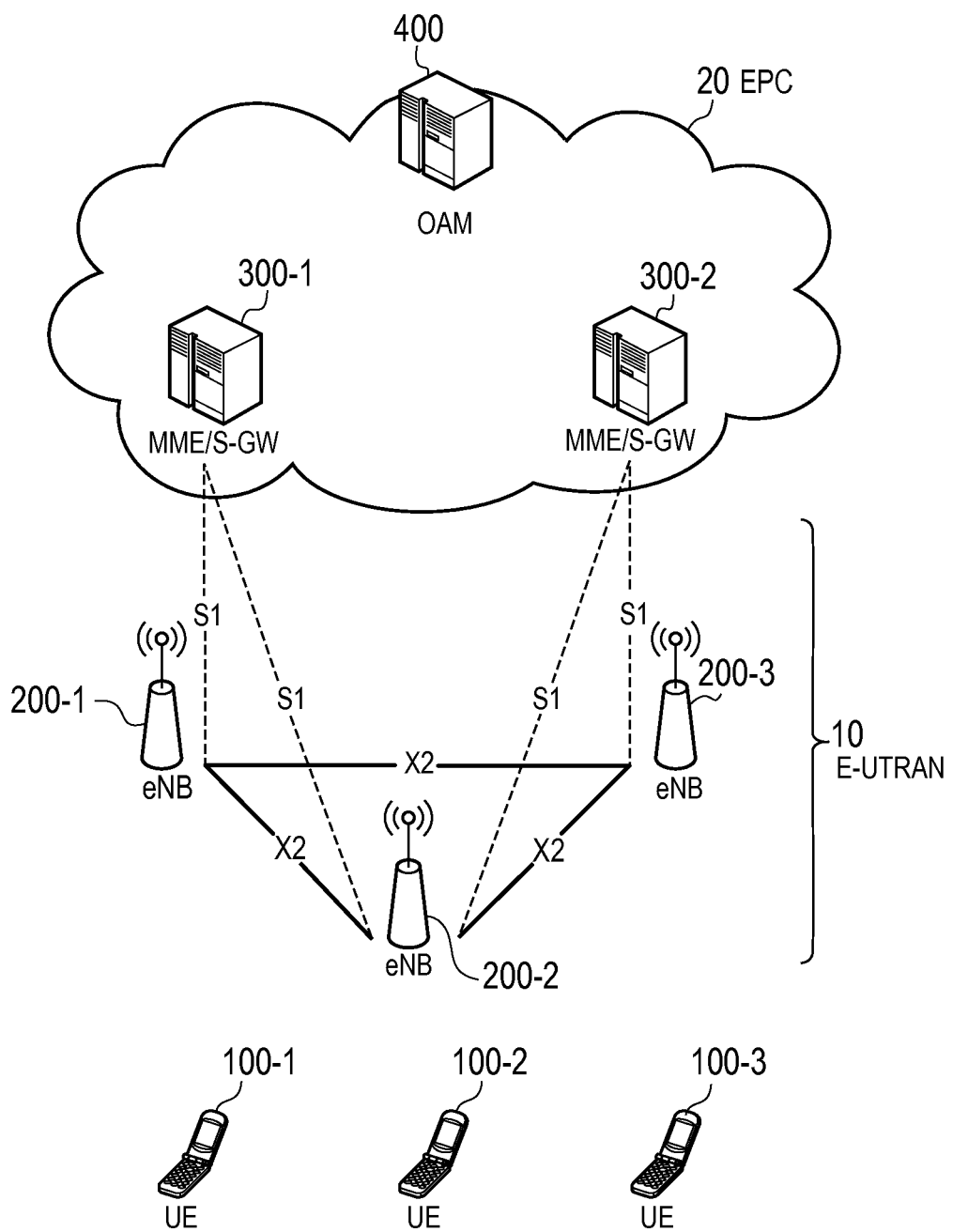
FIG. 1 is a configuration diagram of an LTE system.

A mobile communication system according to an embodiment comprises a first user terminal and a second user terminal. D2D communication is radio communication directly performed between the first user terminal and the second user terminal in a frequency and a time assigned from a base station.

In a time in which the second user terminal does not receive data from the first user terminal, when the data is not received from the first user terminal, the second user terminal transmits failure notification indicating reception failure in the D2D communication to the base station.

In this way, the base station is able to recognize a generation status of the reception failure in the D2D communication, thereby taking measures to solve the reception failure. Consequently, it is possible to appropriately control the D2D communication in consideration of the generation status of the reception failure in the D2D communication.

In a time in which data is to be transmitted to the second user terminal, when there is no data to be transmitted to the second user terminal, the first user terminal may transmit predetermined data to the second user terminal.

In this way, it is possible to prevent erroneous determination that reception failure occurs in the second user terminal.

In the time in which the data is to be transmitted to the second user terminal, when there is no data to be transmitted to the second user terminal and a passage time after data is finally transmitted to the second user terminal is smaller than a threshold value, the first user terminal may repeatedly transmit the finally transmitted data as the predetermined data.

In this way, it is possible to prevent erroneous determination in the second user terminal, and to improve the reliability of communication by allowing the second user terminal to repeatedly receive the same data. For example, the second user terminal synthesizes the same data repeatedly received, thereby enhancing a decoding success rate of the data.

In the time in which the data is to be transmitted to the second user terminal, when there is no data to be transmitted to the second user terminal and the passage time after the data is finally transmitted to the second user terminal is equal to or more than the threshold value, the first user terminal may transmit dummy data as the predetermined data.

In this way, when a long time passes after the data is finally transmitted, the dummy data is transmitted instead of repetitive transmission, so that it is possible to prevent meaningless repetitive transmission.

Alternatively, in the time in which the data is to be transmitted to the second user terminal, when there is no data to be transmitted to the second user terminal, the first user terminal may transmit, to the base station, data notification indicating that there is no data to be transmitted to the second user terminal.

In this case, after the base station received the data notification from the first user terminal, when the base station received the failure notification from the second user terminal, the base station ignores the failure notification from the second user terminal.

In this way, it is possible to prevent determination that reception failure has occurred from being erroneously made in the base station.

When the second user terminal determines that the reception failure is caused by interference from another D2D communication, the second user terminal may include information on the other D2D communication into the failure notification, and transmit the failure notification to the base station.

In this way, the base station is able to recognize a generation status of the reception failure in the D2D communication, and to estimate a generation cause of the reception failure.

Embodiment

Hereinafter, a description will be provided for an embodiment in which D2D communication is introduced to a mobile communication system (hereinafter, an "LIE system") configured in conformity to the 3GPP standards, with reference to the accompanying drawings, below.

(1) Overview of LTE System

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. In the present embodiment, the E-UTRAN 10 and the EPC 20 configure a network.

The UE 100 is a mobile radio communication device and performs radio communication with a cell (a serving cell) with which a radio connection is established. The UE 100 corresponds to a user terminal.

The E-UTRAN 10 includes a plurality of eNBs 200 (evolved Node-Bs). The eNB 200 corresponds to a base station. The eNB 200 manages a cell and performs radio communication with the UE 100 which is established a radio connection with the cell.

In addition, the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MME (Mobility Management Entity)/S-GW (Serving-Gateway) 300 and OAM 400 (Operation and Maintenance).

The MME is a network node that performs various types of mobility control and the like for the UE 100 and corresponds to a control station. The S-GW is a network node that performs transfer control of user data and corresponds to a mobile switching center.

The eNBs 200 are connected mutually via an X2 interface. Furthermore, the eNBs 200 are connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
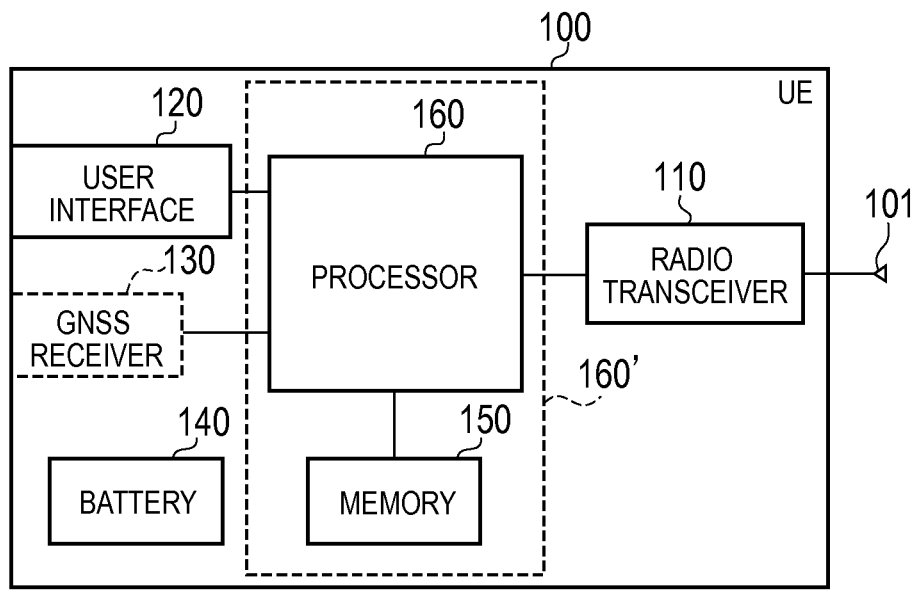
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 corresponds to a storage medium.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used for transmission/reception of a radio signal. The antenna 101 includes a plurality of antenna elements. The radio transceiver 110 converts a baseband signal output from the processor 160 into a radio signal, and transmits the radio signal from the antenna 101. Furthermore, the radio transceiver 110 converts a radio signal received in the antenna 101 into a baseband signal, and outputs the baseband signal to the processor 160.

The user interface 120 is an interface with a user carrying the UE 100, and for example, includes a display, a microphone, a speaker, and various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates power to be supplied to each block of the UE 100.

The memory 150 stores a program to be executed by the processor 160 and information to be used for a process by the processor 160.

The processor 160 includes a baseband processor configured to perform modulation/demodulation, coding/decoding and the like of the baseband signal, and CPU (Central Processing Unit) configured to perform various processes by executing the program stored in the memory 150. Moreover, the processor 160 may include a codec configured to perform coding/decoding of a voice/video signal.

The processor 160, for example, implements various communication protocols which will be described later, as well as implementing various applications. Details of the processes performed by the processor 160 will be described later.

Figure 3:
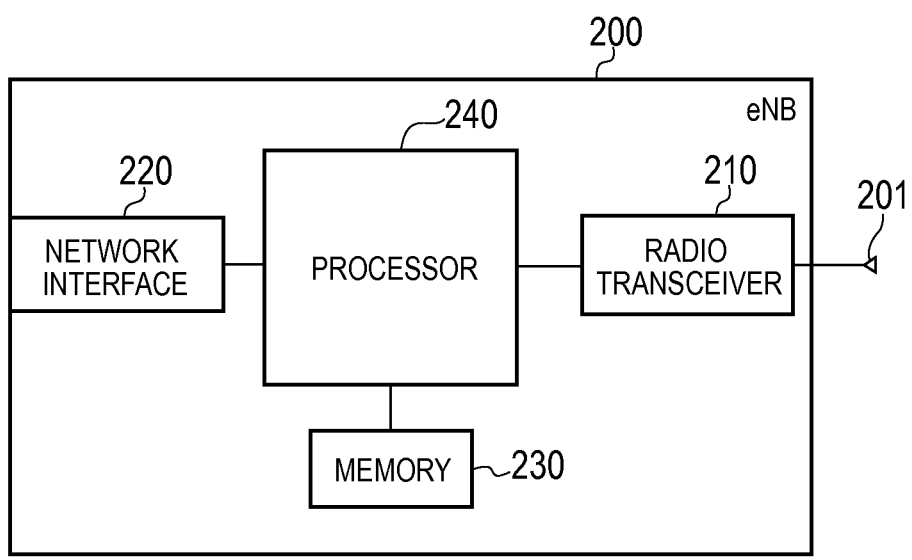
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. Note that the memory 230 may be integrally formed with the processor 240, and this set (that is, a chipset) may be called a processor.

The antenna 201 and the radio transceiver 210 are used for transmission/reception of a radio signal. The antenna 201 includes a plurality of antenna elements. The radio transceiver 210 converts a baseband signal output from the processor 240 into a radio signal, and transmits the radio signal from the antenna 201. Furthermore, the radio transceiver 210 converts a radio signal received in the antenna 201 into a baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor configured to perform modulation/demodulation, coding/decoding and the like of the baseband signal, and CPU configured to perform various processes by executing the program stored in the memory 230.

The processor 240, for example, implements various communication protocols which will be described later. Details of the processes performed by the processor 240 will be described later.

Figure 4:
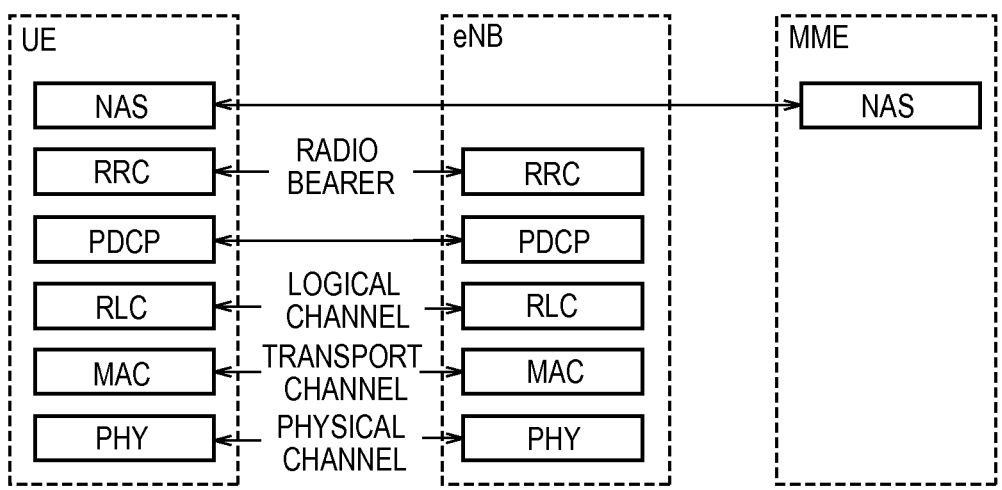
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs coding/decoding, modulation/demodulation, antenna mapping/demapping, and resource mapping/demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a MAC scheduler for determining a transport format (a transport block size, a modulation and coding scheme, and the like) and a resource block of an uplink and a downlink.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression/extension and encryption/decryption.

The RRC layer is defined only in a control plane. Between the RRC layer of the UE 100 and the RRC layer of the eNB 200, data is transmitted through a radio bearer. The RRC layer controls the logical channel, the transport channel, and the physical channel in response to establishment, re-establishment, and release of the radio bearer. When there is an RRC connection between RRC of the UE 100 and RRC of the eNB 200, the UE 100 is in an RRC connected state. Otherwise, the UE 100 is in an RRC idle state.

A NAS (Non-Access Stratum) layer positioned above the RRC layer performs session management, mobility management and the like.

Figure 5:
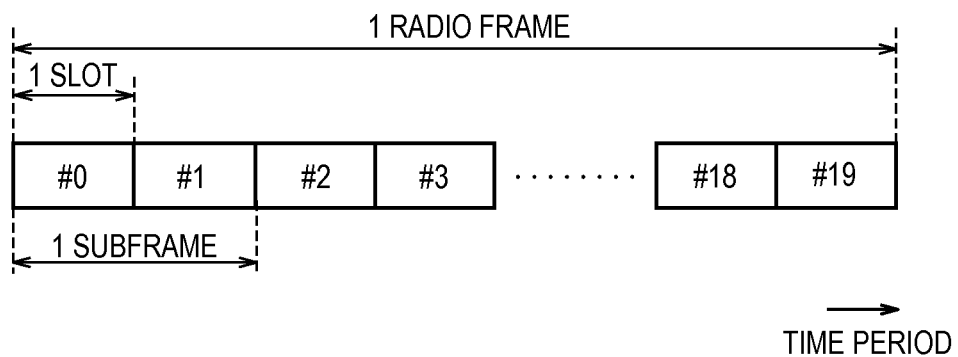
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame includes 10 subframes arranged in a time-period direction, wherein each subframe includes two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP).

In the downlink, an interval of several symbols at the head of each subframe is a control region mainly used as a physical downlink control channel (PDCCH). Furthermore, the other interval of each subframe is a region mainly used as a physical downlink shared channel (PDSCH).

In the uplink, both end portions in the frequency direction of each subframe are control regions mainly used as a physical uplink control channel (PUCCH). Furthermore, the center portion in the frequency direction of each subframe is a region mainly used as a physical uplink shared channel (PUSCH).

(2) Overview of D2D Communication

Next, the LTE system will be described with comparing the normal communication (the cellular communication) with the D2D communication.

Figure 6:
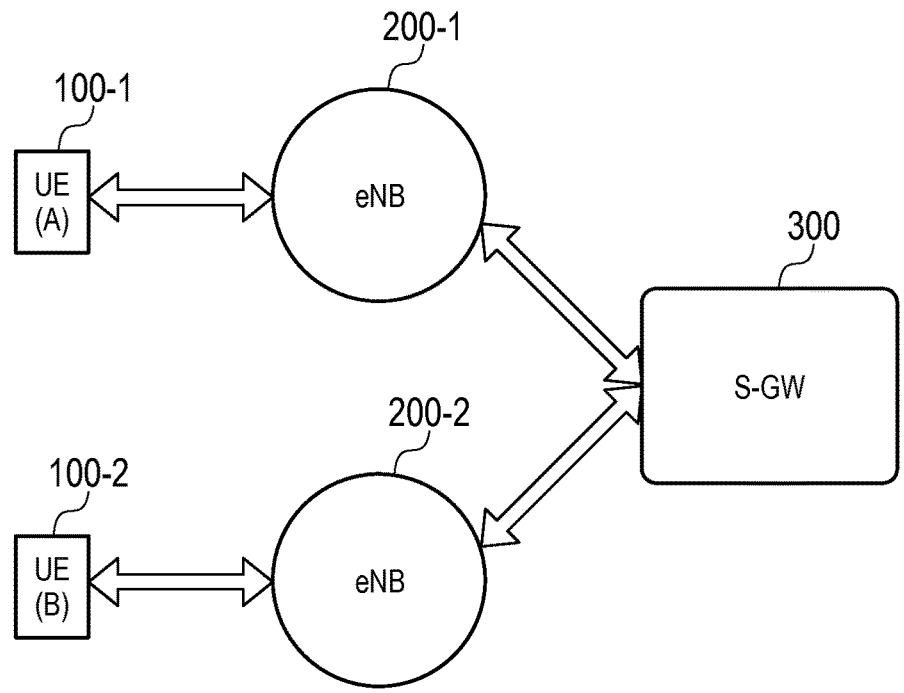
FIG. 6 illustrates a data path in cellular communication.

FIG. 6 illustrates a data path in the cellular communication. Furthermore, FIG. 6 illustrates the case in which the cellular communication is performed between UE (A) 100-1 which is established a radio connection with eNB 200-1 and UE (B) 100-2 which is established a radio connection with eNB 200-2. In addition, the data path indicates a data transfer path of user data (a user plane).

As illustrated in FIG. 6, the data path of the cellular communication passes through the network. Specifically, the data path via the eNB 200-1, the S-GW 300, and the eNB 200-2 is set.

Figure 7:
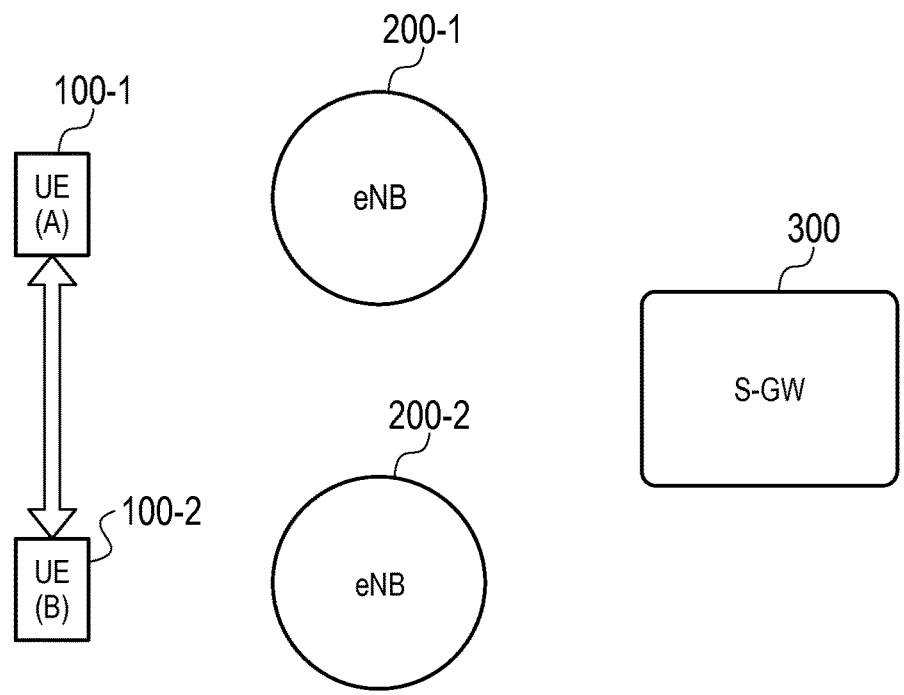
FIG. 7 illustrates a data path in D2D communication.

FIG. 7 illustrates a data path in the D2D communication. Furthermore, FIG. 7 illustrates the case in which the D2D communication is performed between the UE (A) 100-1 which is established a radio connection with the eNB 200-1 and the UE (B) 100-2 which is established a radio connection with the eNB 200-2.

As illustrated in FIG. 7, the data path of the D2D communication does not pass through the network. That is, direct radio communication is performed between the UEs. In this way, when the UE (B) 100-2 exists in the vicinity of the UE (A) 100-1, the D2D communication is performed between the UE (A) 100-1 and the UE (B) 100-2, thereby obtaining an effect that a traffic load of the network and a battery consumption amount of the UE 100 are reduced and so on.

In addition, the D2D communication is assumed to be performed in the frequency band of the LTE system, and for example, in order to avoid interference to the cellular communication, the D2D communication is performed under the control of the network.

(3) Operation According to Embodiment

Hereinafter, the operation according to the embodiment will be described.

(3.1) Search Operation

The UE (A) desiring to start the D2D communication should have a (Discover) function of discovering the UE (B) that is a communication partner existing in the vicinity of the UE (A). Furthermore, the UE (B) should have a (Discoverable) function of being discovered by the UE (A).

In the present embodiment, the UE (A) periodically transmits a search signal (a Discover signal) to around the UE (A) in order to discover the UE (B) that is a communication partner. In order to be discovered by the UE (A), the UE (B) waits for the search signal and transmits a response signal to the UE (A) in response to the reception of the search signal. Then, the network determines whether the D2D communication by the UE (A) and the UE (B) is possible.

(3.1.1) Operation Pattern 1

Figure 8:
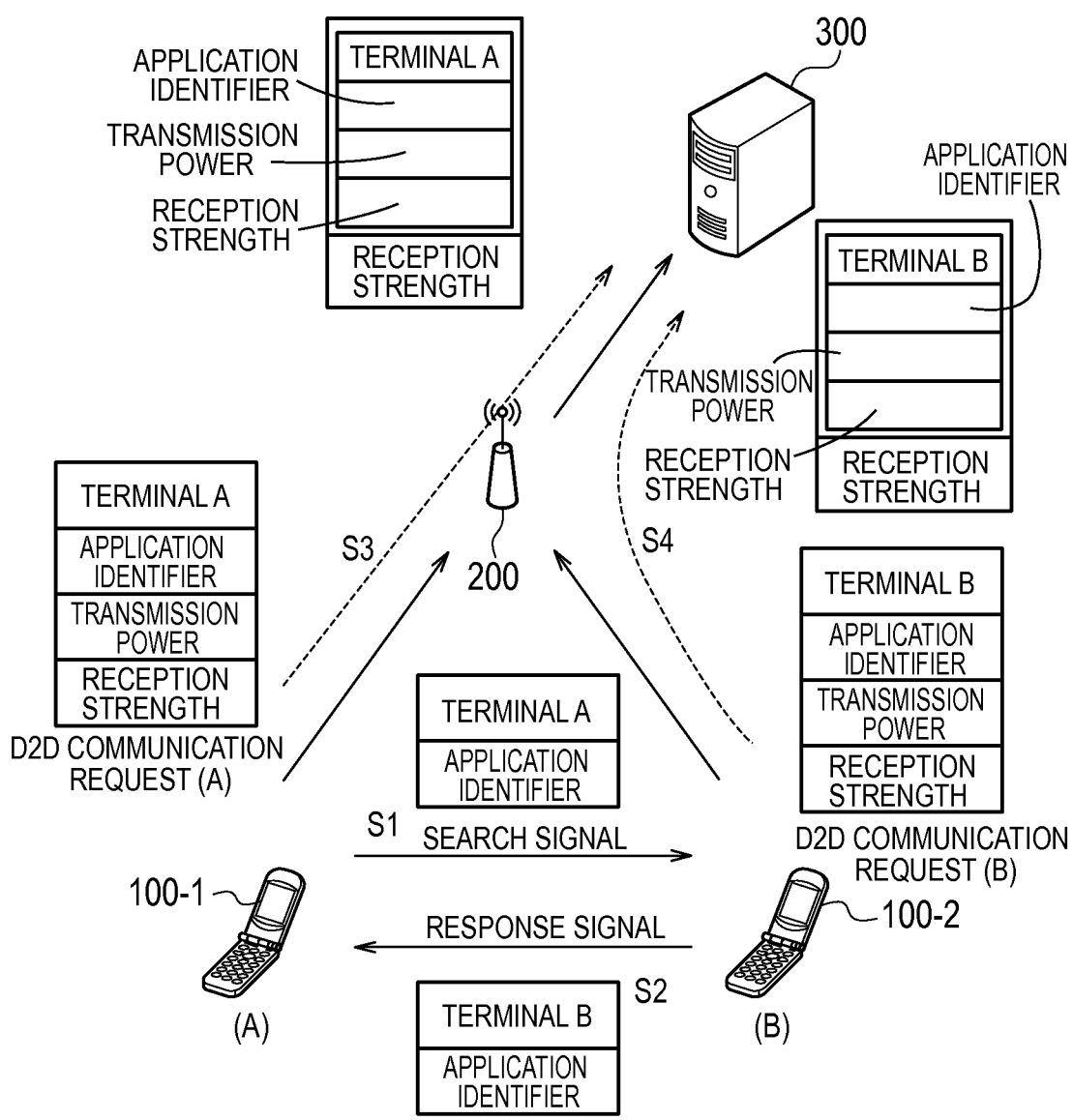
FIG. 8 is a sequence diagram of a search operation pattern 1 according to an embodiment.

FIG. 8 is a sequence diagram of a search operation pattern 1 according to the present embodiment.

As illustrated in FIG. 8, in step S1, the UE (A) 100-1 transmits a search signal to around the UE (A) 100-1. The search signal includes an identifier of the UE (A) 100-1 and an identifier of an application to be used in the D2D communication. The identifier of the application, for example, is used in order to limit UE (UE which will transmit a response signal) which will respond to the search signal. The search signal may further include an identifier of the UE (B) 100-2 that is a communication partner, or an identifier of a group (a D2D communication group) of the UE 100 which will perform the D2D communication. Furthermore, when transmitting the search signal, the UE (A) 100-1 stores transmission power of the search signal.

The UE (B) 100-2 waits for the search signal and receives the search signal from the UE (A) 100-1. The UE (B) 100-2 measures received power (reception strength) of the search signal and stores the measured received power.

In step S2, the UE (B) 100-2 transmits a response signal to the UE (A) in response to the reception of the search signal. The response signal includes an identifier of the UE (B) 100-2 and an identifier of an application to be used in the D2D communication. Furthermore, when transmitting the response signal, the UE (B) 100-2 stores transmission power of the response signal.

The UE (A) 100-1 waits for the response signal and receives the response signal from the UE (B) 100-2. The UE (A) 100-1 measures received power (reception strength) of the response signal and stores the measured received power.

In step S3, in response to the reception of the response signal, the UE (A) 100-1 transmits, to the eNB 200, a D2D communication request (A) indicating that the start of the D2D communication is desired. The D2D communication request (A) includes the identifier of the UE (A) 100-1 and the identifier of the application to be used in the D2D communication. The D2D communication request (A) further includes information on the transmission power of the search signal and information on the received power of the response signal.

When the D2D communication request (A) is received, the eNB 200 measures received power of the D2D communication request (A), adds information on the measured received power to the D2D communication request (A), and transfers the D2D communication request (A) to the MME/S-GW 300.

In step S4, in response to the transmission of the response signal, the UE (B) 100-2 transmits, to the eNB 200, a D2D communication request (B) indicating that the start of the D2D communication is desired. The D2D communication request (B) includes the identifier of the UE (B) 100-2 and the identifier of the application to be used in the D2D communication. The D2D communication request (B) further includes information on the transmission power of the response signal and information on the received power of the search signal.

When the D2D communication request (B) is received, the eNB 200 measures received power of the D2D communication request (B), adds information on the measured received power to the D2D communication request (B), and transfers the D2D communication request (B) to the MME/S-GW 300.

When the D2D communication request (A) and the D2D communication request (B) are received, the MME/S-GW 300 determines whether the D2D communication by the UE (A) 100-1 and the UE (B) 100-2 is possible on the basis of a distance between the UEs, a distance between the UE and the eNB, application characteristics and the like, which are obtained from the D2D communication request (A) and the D2D communication request (B). For example, the MME/S-GW 300 determines whether the D2D communication is possible by at least one of the following first determination reference to third determination reference.

Firstly, when the UE (B) 100-2 does not exist in the vicinity of the UE (A) 100-1, the MME/S-GW 300 determines that the D2D communication is not possible. This is because the D2D communication is basically performed between neighboring UEs 100, and interference and a battery consumption amount are increased when the D2D communication is performed between UEs 100 remote from each other.

For example, since it is possible to know propagation loss by the difference between the transmission power of the search signal included in the D2D communication request (A) and the received power of the search signal included in the D2D communication request (B), the MME/S-GW 300 is able to estimate a distance between the UE (A) 100-1 and the UE (B) 100-2 on the basis of the propagation loss. Similarly, since it is possible to know propagation loss by the difference between the transmission power of the response signal included in the D2D communication request (B) and the received power of the response signal included in the D2D communication request (A), the MME/S-GW 300 is able to estimate the distance between the UE (A) 100-1 and the UE (B) 100-2 on the basis of the propagation loss.

In addition, when the transmission power of the search signal and the transmission power of the response signal are each uniformly defined in an entire system in advance, information on the transmission power may not be included in the D2D communication request.

Secondly, when the eNB 200 exists in the vicinity of the UE (A) 100-1 or the eNB 200 exists in the vicinity of the UE (B) 100-2, the MME/S-GW 300 determines that the D2D communication is not possible. This is because interference to the eNB 200 is increased when the D2D communication is performed in the vicinity of the eNB 200.

For example, since it is possible to know rough propagation loss from received power when the eNB 200 received the D2D communication request (A), the MME/S-GW 300 is able to estimate the distance between the UE (A) 100-1 and the eNB 200 on the basis of the propagation loss. Similarly, since it is possible to know rough propagation loss from received power when the eNB 200 received the D2D communication request (B), the MME/S-GW 300 is able to estimate the distance between the UE (B) 100-2 and the eNB 200 on the basis of the propagation loss. In addition, in order to accurately obtain the propagation loss, the transmission power of the D2D communication request may be notified from the UE.

Thirdly, in the case of an application that generates temporary traffic or in a small amount (a low load), the MME/S-GW 300 determines that the D2D communication is not possible. In other words, only in the case of an application that generates continuous traffic with a large capacity (a high load), the MME/S-GW 300 determines that the D2D communication is possible. This is because a merit of the D2D communication may not be sufficiently achieved when treating traffic temporarily or in a low load.

For example, since a streaming or video communication application generates continuous traffic with a high load, the MME/S-GW 300 determines that the D2D communication is possible. Details thereof will be described later, but the D2D communication may also be applied to the application that generates the traffic temporarily or in a small amount (a low load).

When it is determined that the D2D communication by the UE (A) 100-1 and the UE (B) 100-2 is possible, the MME/S-GW 300 notifies the eNB 200 of necessary information and the fact that the D2D communication is possible, so that the D2D communication is started under the control of the eNB 200.

According to the operation pattern 1, the D2D communication is possible only when the UE (A) 100-1 and the UE (B) 100-2 are in a state suitable for the D2D communication.

(3.1.2) Operation Pattern 2

The aforementioned operation pattern 1 assumes the case in which the UE (B) always waits for the search signal. However, for example, it is possible to assume the case of stopping waiting for the search signal in order to reduce a battery consumption amount. In this regard, in the operation pattern 2, it is assumed that UE (A) is able to discover UE (B) in such a sleep state of the D2D communication.

Figure 9:
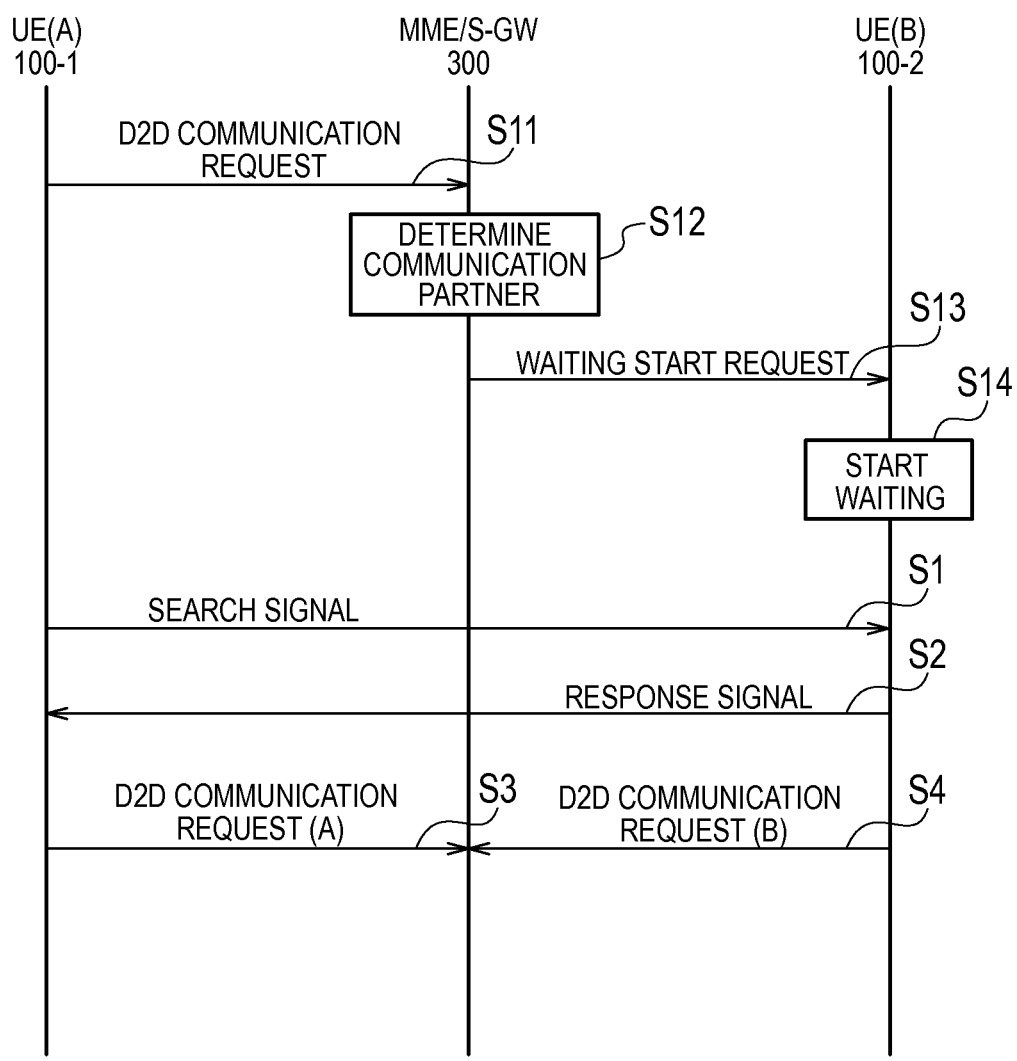
FIG. 9 is a sequence diagram of a search operation pattern 2 according to the embodiment.

FIG. 9 is a sequence diagram of the search operation pattern 2 according to the present embodiment.

As illustrated in FIG. 9, in step S11, the UE (A) 100-1 transmits, to the eNB 200, a D2D communication request indicating that the start of the D2D communication is desired. The eNB 200 transfers the D2D communication request from the UE (A) 100-1 to the MME/S-GW 300. The D2D communication request includes the identifier of the UE (A) 100-1 and the identifier of the application to be used in the D2D communication. The D2D communication request may further include an identifier of the UE (B) 100-2 that is a communication partner, or an identifier of a group (a D2D communication group) of the UE 100 which will perform the D2D communication.

The UE (A) 100-1 transmits the D2D communication request and also starts the transmission of the search signal. Alternatively, the UE (A) 100-1 starts the transmission of the search signal at the timing at which a response for the D2D communication request was received from the network (the eNB 200 or the MME/S-GW 300). This is because it is assumed that a waiting instruction is reached from the network to the UE (B) 100-2 at this timing.

In step S12, the MME/S-GW 300 designates UE (B) 100-2, which satisfies the D2D communication request from the UE (A) 100-1, among UEs 100 existing in a camping area (or a camping cell) of the UE (A) 100-1. Furthermore, the MME/S-GW 300 confirms the state of the UE (B) 100-2 so as to determine whether the waiting for the search signal is in progress or being cancelled. Hereinafter, the following description will be given on the assumption that the UE (B) 100-2 stops waiting for the search signal.

In step S13, the MME/S-GW 300 transmits, to the eNB 200, a waiting start request directed to the UE (B) 100-2. The eNB 200 transfers the waiting start request from the MME/S-GW 300 to the UE (B) 100-2.

In step S14, when the waiting start request is received, the UE (B) 100-2 starts to wait for the search signal. Specifically, the UE (B) 100-2 attempts the reception of the search signal at a predetermined cycle.

After starting to wait for the search signal, when the search signal from the UE (A) 100-1 is received (step S1), the UE (B) 100-2 transmits a response signal for the search signal to the UE (A) 100-1 (step S2). Subsequent operations are similar to those of the operation pattern 1.

According to the operation pattern 2, the UE (B) 100-2 even in the sleep state of the D2D communication can be discovered by the UE (A) 100-1.

(3.2) Radio Resource Assignment in D2D Communication

Next, an assignment operation of a radio resource in the D2D communication will be described. The "radio resource" indicates a resource block (RB) that is a unit of a time-frequency resource, that is, a frequency band. Furthermore, a modulation and coding scheme (MCS) in radio communication may be included in the "radio resource".

(3.2.1) Method of Assigning Radio Resource

The eNB 200 performs quasi-static radio resource assignment for the D2D communication. In the present embodiment, the eNB 200 determines a method of assigning radio resource in the D2D communication in response to the characteristics of an application that is used in the D2D communication.

Figure 10:
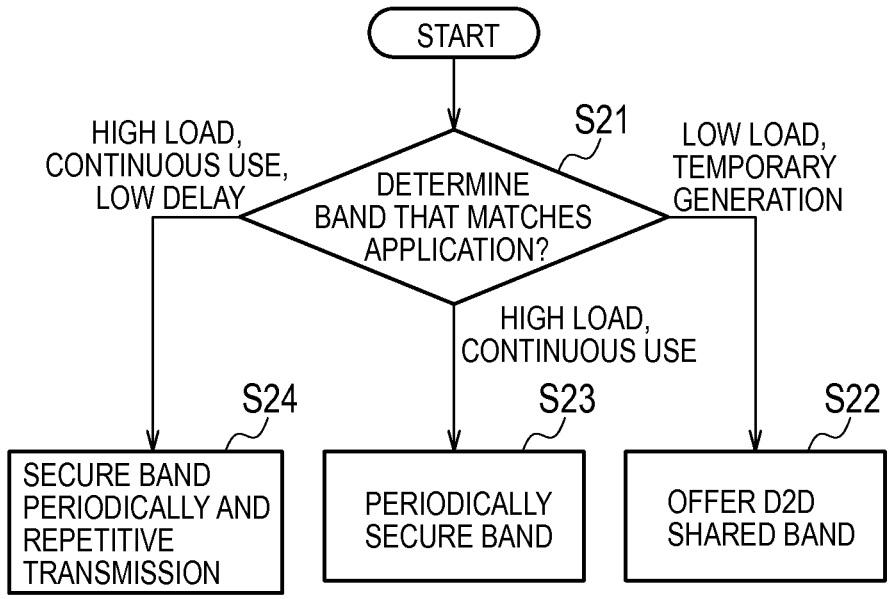
FIG. 10 is a flow diagram of a determination operation of a method of assigning radio resource according to the embodiment.

FIG. 10 is a flow diagram of a determination operation of the method of assigning radio resource in the present embodiment. Before the present flow is performed, the eNB 200 acquires an identifier of the application, which is used in the D2D communication, from the MME/S-GW 300. Alternatively, the eNB 200 may acquire the identifier of the application, which is used in the D2D communication, from the UE 100 performing the D2D communication.

As illustrated in FIG. 10, in step S21, the eNB 200 recognizes the characteristics of the application from the identifier of the application that is used in the D2D communication. For example, the eNB 200 holds in advance a table, in which the identifier of the application is correlated with the characteristics thereof, and is able to recognize the characteristics of the application by using the table.

When traffic generated by the application used in the D2D communication produces a low load and is temporary (for example, in the case of a chat and the like), the eNB 200 determines to assign a radio resource, which is commonly used in another D2D communication, to the D2D communication in step S22. In this way, it is possible to save the radio resource. In this case, difference codes (spread codes) are assigned to each of various types of D2D communication to which the same radio resource is assigned, so that code division is possible. For example, a code 1 is assigned to a D2D communication pair 1 and a code 2 is assigned to a D2D communication pair 2, so that each pair is able to separate the information of one pair from the information of the other pair.

Furthermore, when the traffic generated by the application used in the D2D communication produces a high load and is continuous (for example, in the case of streaming and the like), the eNB 200 determines to periodically assign a dedicated radio resource to the D2D communication in step S23. In this way, it is possible to transmit a large amount of traffic in the D2D communication.

Moreover, when the traffic generated by the application used in the D2D communication has a high load, is continuous, and requires low delay (for example, video communication and the like), the eNB 200 determines assignment such that the dedicated radio resource is repeatedly transmitted in a cyclic manner, in step S24. In this way, it is possible to transmit a large amount of traffic in the D2D communication and also possible to enhance the reliability of communication. The repetitive transmission is not limited to a scheme for repeatedly transmitting the same data a plurality of times. For example, the repetitive transmission may include a scheme for changing a redundant bit whenever the radio resource is transmitted and repeatedly transmitting the radio resource (for example, an Incremental Redundancy scheme).

In accordance with the method of assigning radio resource according to the present embodiment, it is possible to appropriately assign the radio resource in the D2D communication in response to the characteristics of the application used in the D2D communication.

(3.2.2) Radio Resource Assignment Based on Buffer State Report

When the UE 100 simultaneously performs the cellular communication and the D2D communication, it is preferable that the eNB 200 is able to control radio resource assignment for the D2D communication, separately from the cellular communication. In the present embodiment, it is assumed that the radio resource assignment is controlled for the D2D communication, separately from the cellular communication.

Furthermore, in the cellular communication, there is a scheme in which the UE 100 transmits a buffer state report (BSR) to the eNB 200, and the eNB 200 controls the assignment of an uplink radio resource to the UE 100 on the basis of the BSR from the UE 100, the BSR indicating the amount of data waiting for transmission (a transmission buffer stay amount) to the eNB 200. In the present embodiment, it is assumed that the radio resource assignment is also controlled in the D2D communication on the basis of the BSR.

Hereinafter, a description will be provided for an operation for performing radio resource assignment control of the D2D communication by employing an example in which the UE (A) 100-1 performing only the cellular communication by using a plurality of applications switches a part of the applications to the D2D communication.

Figure 11:
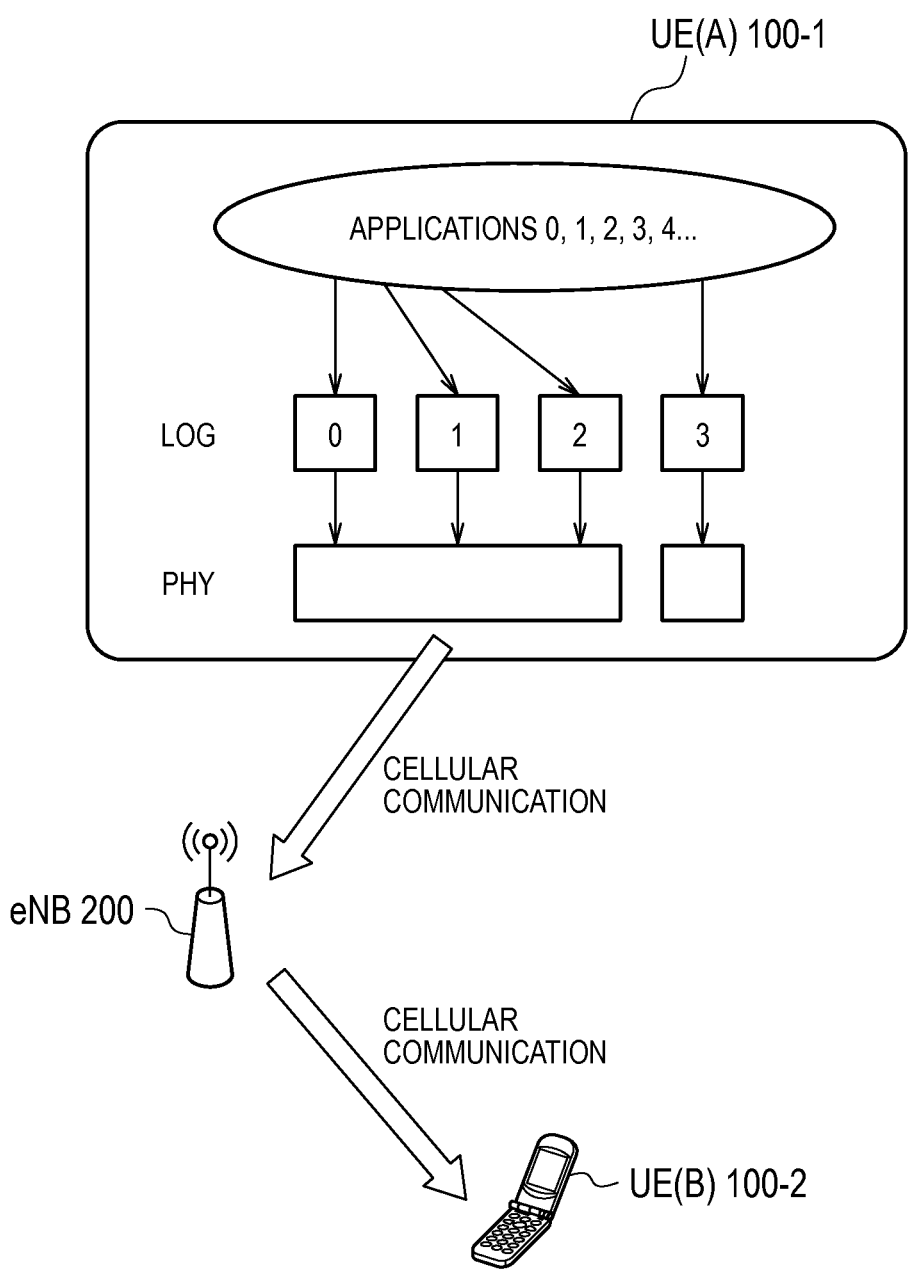
FIG. 11 is a diagram for explaining a radio resource assignment operation according to the embodiment (part 1).

FIG. 11 is a diagram for explaining the operation of the UE (A) 100-1 performing only the cellular communication by using a plurality of applications.

As illustrated in FIG. 11, the UE (A) 100-1 implements applications 0, 1, 2, 3, . . . , and transmits traffic generated by each application and a control signal to the eNB 200 by using a plurality of logical channels. In the physical (PHY) layer, each logical channel is provided with a buffer for temporarily holding data transmitted through the logical channel.

The logical channels are grouped into a plurality of logical channel groups (LCG). In the example of FIG. 11, there are four LCGs of LCG 0 to LCG 3. When BSR is transmitted for each logical channel, since overhead is increased, the BSR is defined to be transmitted for each LCG.

The UE (A) 100-1 transmits the BSR to the eNB 200 for each of the LCG 0 to the LCG 3. A scheduler of the eNB 200 recognizes a transmission buffer stay amount indicated by the BSR for each of the LCG 0 to the LCG 3, and performs uplink radio resource assignment corresponding to the transmission buffer stay amount.

Figure 12:
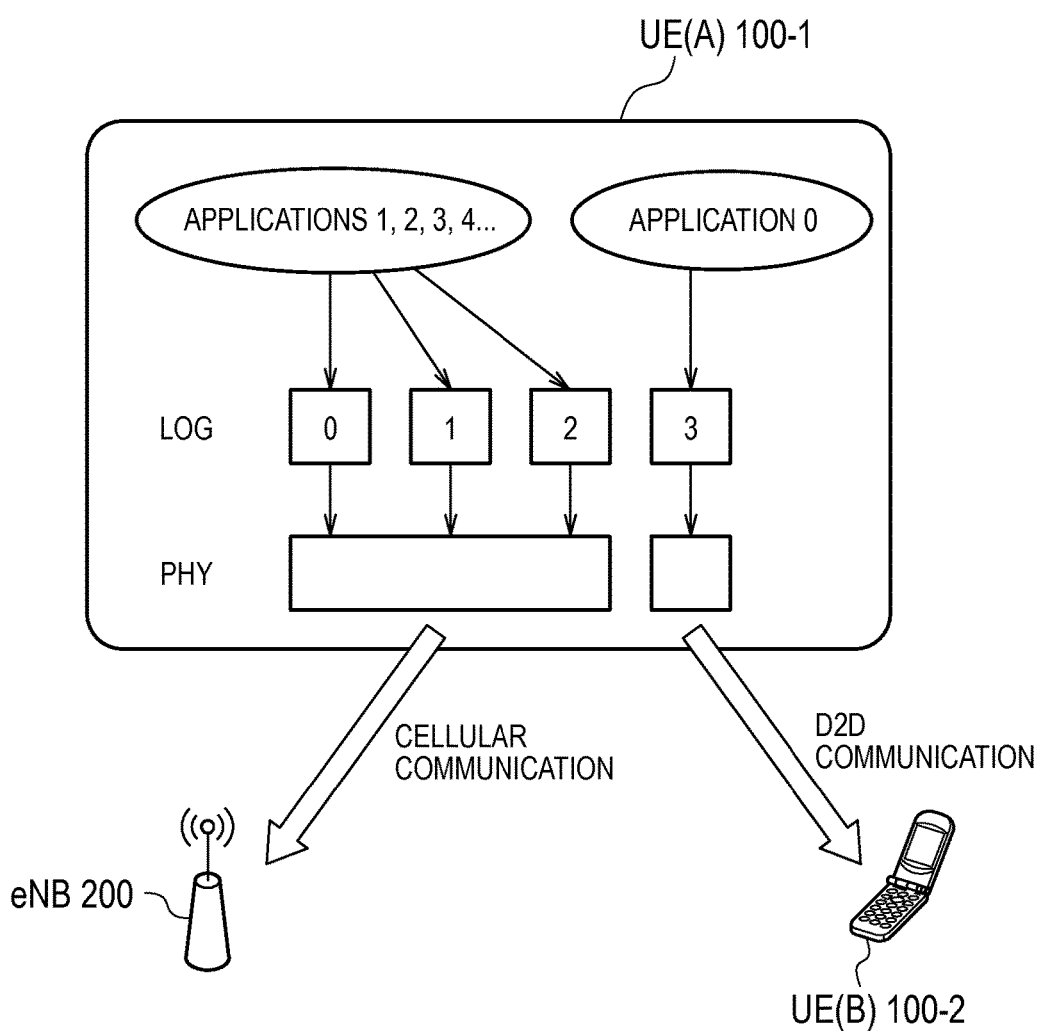
FIG. 12 is a diagram for explaining a radio resource assignment operation according to the embodiment (part 2).

FIG. 12 is a diagram for explaining the operation of the UE (A) 100-1 when switching a part of the applications to the D2D communication with the UE (B) 100-2 from the situation of FIG. 11.

When switching a part of the applications to the D2D communication, the MME/S-GW 300 (or the eNB 200) designates an application (here, the application 0) to be used in the D2D communication, and notifies the UE (A) 100-1 of the designated application 0.

The UE (A) 100-1 sets certain LCG (here, the LCG 3) to be dedicated for the application 0. That is, the UE (A) 100-1 secures the LCG 3 for the D2D communication, in addition to the LCG 0 to the LCG 2 for the cellular communication.

Furthermore, the UE (A) 100-1 secures a hardware resource for the D2D communication with respect to the LCG 3 for the D2D communication. The hardware resource indicates a resource (a processing resource) of the processor 160 and a resource (a memory resource) of the memory 150.

Moreover, the UE (A) 100-1 notifies the eNB 200 of the LCG 3 for the D2D communication.

The eNB 200 assigns a radio network temporary identifier (RNTI) for the D2D communication to the LCG 3 for the D2D communication, which was notified from the UE (A) 100-1. The RNTI is a UE identifier that is temporarily provided for control. For example, the PDCCH includes RNTI of the UE 100 that is a transmission destination, and the UE 100 determines the presence or absence of radio resource assignment on the basis of the presence or absence of the RNTI of the UE 100 in the PDCCH.

Hereinafter, the RNTI for the D2D communication is called "D2D-RNTI". In this way, the eNB 200 assigns the D2D-RNTI to the UE (A) 100-1, in addition to RNTI (C-RNTI) for the cellular communication. As a consequence, the total two RNTIs (the C-RNTI and the D2D-RNTI) are assigned to the UE (A) 100-1, so that initial setting of the D2D communication is completed.

Figure 13:
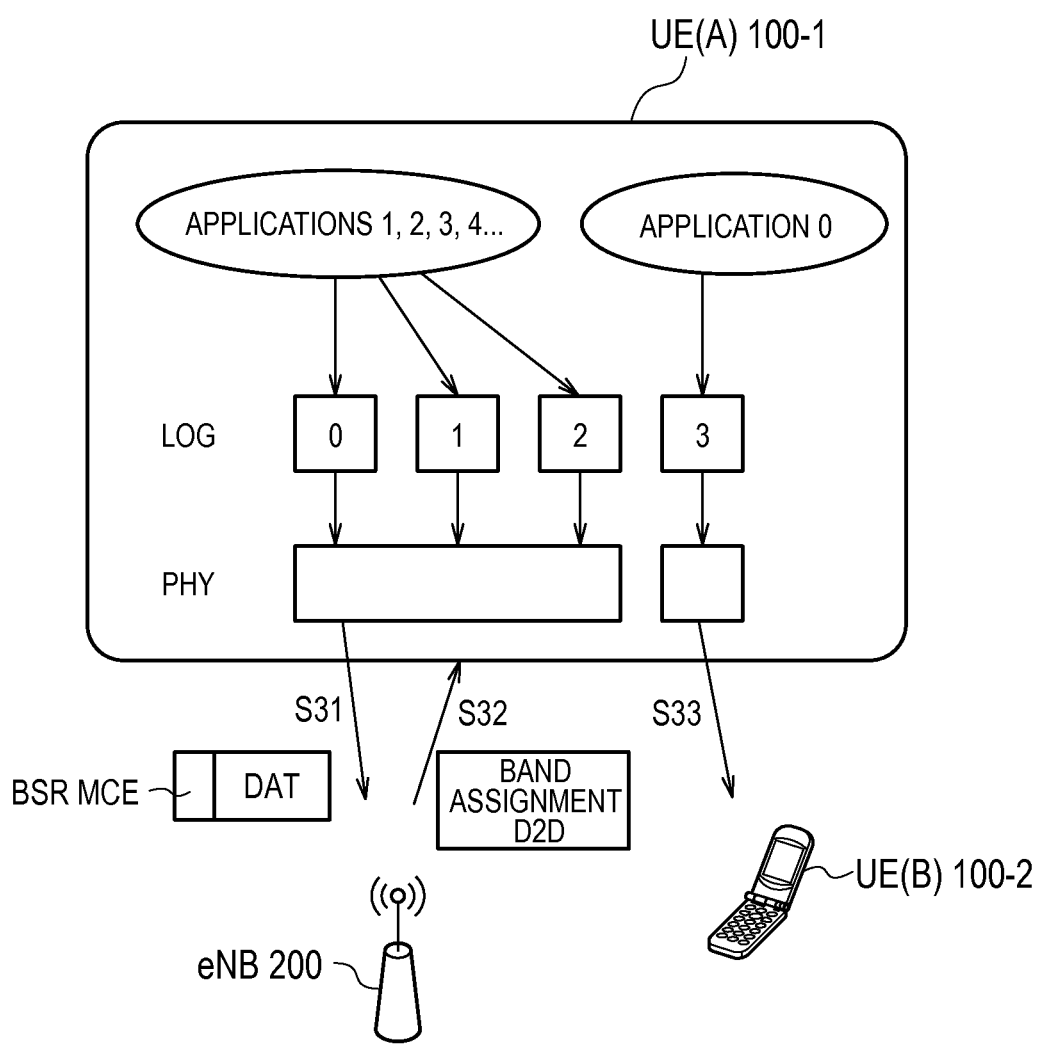
FIG. 13 is a diagram for explaining a radio resource assignment operation according to the embodiment (part 3).

FIG. 13 is a diagram for explaining the operation of the UE (A) 100-1 during the D2D communication.

As illustrated in FIG. 13, in step S31, the UE (A) 100-1 transmits BSR MCE (MAC Control Element) to the eNB 200 together with transmission data (DAT) directed to the eNB 200. The BSR MCE includes BSRs of each of the LCG 0 to the LCG 3.

In step S32, on the basis of the BSR MCE, the eNB 200 recognizes a transmission buffer stay amount indicated by the BSR with respect to each of the LCG 0 to the LCG 3, and performs radio resource assignment corresponding to the transmission buffer stay amount for each of the LCG 0 to the LCG 3. Furthermore, on the basis of the transmission buffer stay amount for the LCG 3, the eNB 200 determines a radio resource to be assigned to the D2D communication. Then, the eNB 200 notifies the UE (A) 100-1 of the radio resource, which is to be assigned to the D2D communication, using the D2D-RNTI on the PDCCH.

In step S33, the UE (A) 100-1 transmits to the UE (B) 100-2 by using the radio resource assigned to the D2D communication.

In accordance with the radio resource assignment according to the present embodiment, it is possible to control radio resource assignment for the D2D communication, separately from the cellular communication. Furthermore, it is also possible to control the assignment of a radio resource in the D2D communication on the basis of the BSR.

(3.3) Transmission Power Control of D2D Communication

As described above, when the traffic generated by the application used in the D2D communication produces a high load and is continuous, a dedicated radio resource is periodically assigned to the D2D communication. The UE (A) 100-1 and the UE (B) 100-2 performing the D2D communication alternately use the periodically assigned radio resource for transmission. Furthermore, the UE (A) 100-1 and the UE (B) 100-2 may perform repetitive transmission in response to an error situation and the like.

Figure 14:
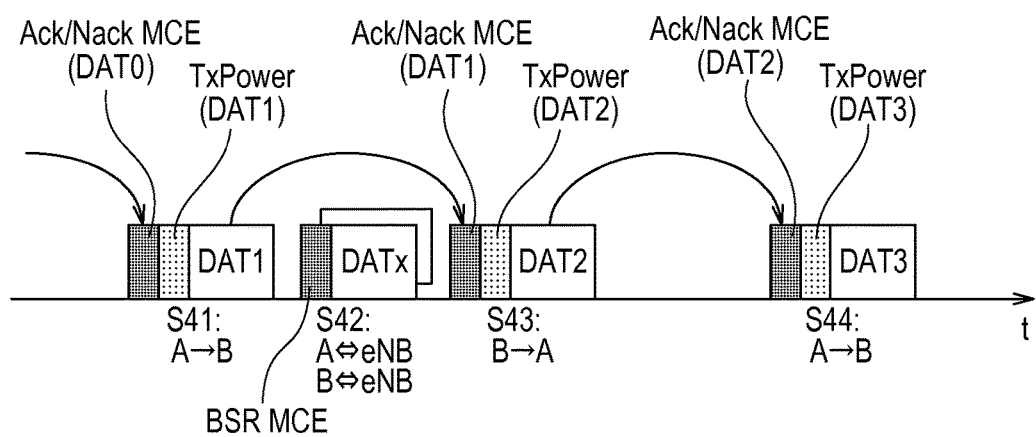
FIG. 14 is a diagram for explaining transmission power control and retransmission control according to the embodiment.

FIG. 14 is a diagram for explaining transmission power control and retransmission control in the D2D communication. In FIG. 14, steps S41, S43, and S44 correspond to the D2D communication and step S42 corresponds to the cellular communication.

As illustrated in FIG. 14, in step S41, the UE (A) 100-1 transmits data 1 to the UE (B) 100-2. The UE (A) 100-1 transmits TxPower MCE including information on transmission power of the transmission together with the data 1. In this way, when transmitting a radio signal to the UE (B) 100-2, the UE (A) 100-1 notifies the UE (B) 100-2 of the transmission power. Furthermore, the UE (A) 100-1 transmits HARQ Ack/Nack MCE including information on HARQ Ack/Nack for data 0, which was received from the UE (B) 100-2 in previous time, together with the data 1.

When the data 1 is received from the UE (A) 100-1, the UE (B) 100-2 measures received power of the reception. Furthermore, on the basis of the difference between the measured received power and the transmission power indicated by the TxPower MCE transmitted together with the data 1, the UE (B) 100-2 determines transmission power when performing next transmission with respect to the UE (A) 100-1. For example, as the difference between the transmission power and the received power of the data 1 from the UE (A) 100-1 is large, since propagation loss is large, the UE (B) 100-2 determines the transmission power when performing the next transmission with respect to the UE (A) 100-1 to be large.

In step S42, each of the UE (A) 100-1 and the UE (B) 100-2 performs transmission of data to the eNB 200. As described above, the UE (A) 100-1 and the UE (B) 100-2 transmit the BSR MCE at the time of the transmission of the data to the eNB 200.

In step S43, the UE (B) 100-2 transmits data 2 to the UE (A) 100-1. The UE (B) 100-2 transmits TxPower MCE including information on transmission power of the transmission together with the data 2. In this way, when transmitting a radio signal to the UE (A) 100-1, the UE (B) 100-2 notifies the UE (B) 100-2 of the transmission power. Furthermore, the UE (B) 100-2 transmits HARQ Ack/Nack MCE including information on HARQ Ack/Nack for the data 1, which was received from the UE (A) 100-1 in previous time, together with the data 2.

When the data 2 is received from the UE (B) 100-2, the UE (A) 100-1 measures received power of the data 2. Furthermore, on the basis of the difference between the measured received power and the transmission power indicated by the TxPower MCE transmitted together with the data 2, the UE (A) 100-1 determines transmission power when performing next transmission with respect to the UE (B) 100-2.

In step S44, the UE (A) 100-1 transmits the data 3 to the UE (B) 100-2. The UE (A) 100-1 transmits TxPower MCE including information on transmission power of the transmission together with the data 3. Furthermore, the UE (A) 100-1 transmits HARQ Ack/Nack MCE including information on HARQ Ack/Nack for data 2, which was received from the UE (B) 100-2 in previous time, together with the data 3.

Such processes are repeated, so that the transmission power control and the retransmission control in the D2D communication are performed.

In addition, when the distance between the UE (A) 100-1 and the UE (B) 100-2 is increased by the movement of the UE (A) 100-1 and/or the UE (B) 100-2, transmission power in the D2D communication becomes large. In the present embodiment, when the transmission power in the D2D communication exceeds maximum transmission power, the D2D communication is controlled to be stopped and switched to the cellular communication.

Figure 15:
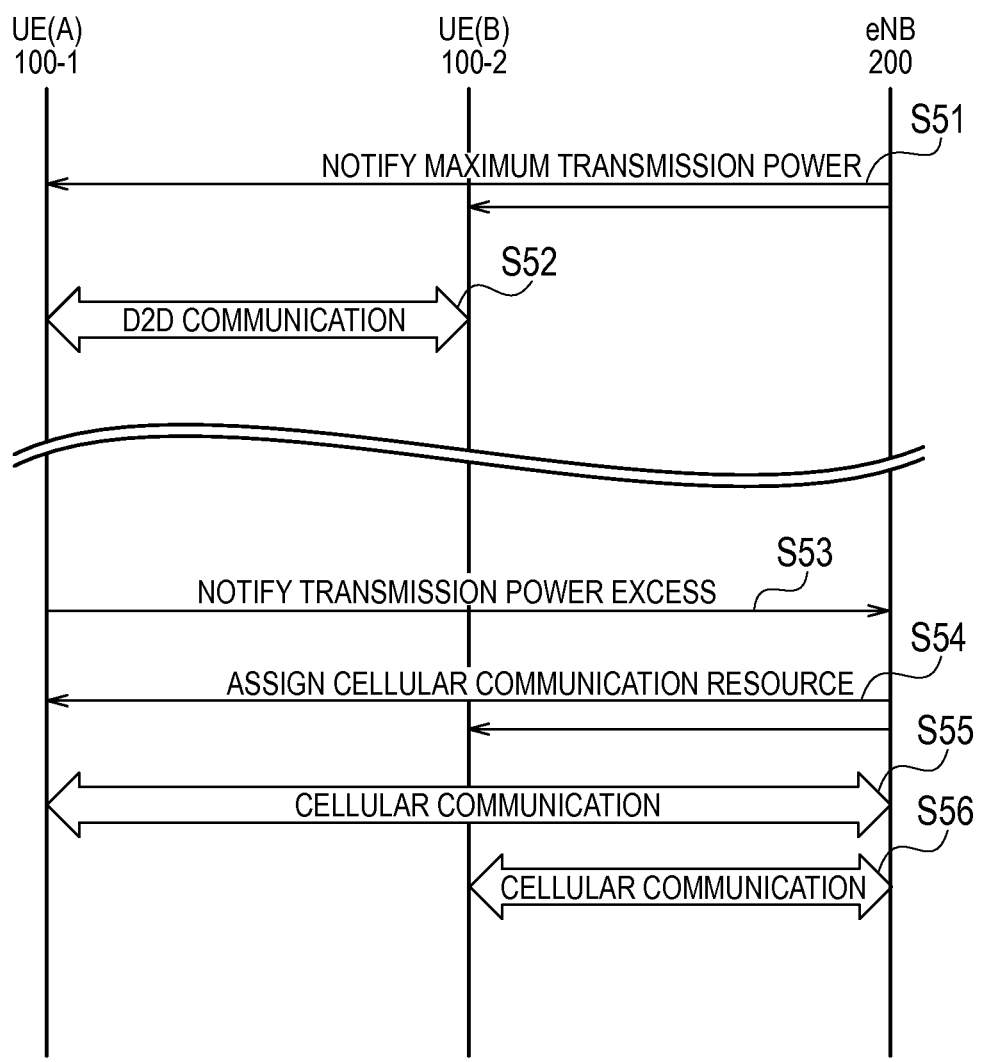
FIG. 15 is a sequence diagram when transmission power in the D2D communication exceeds maximum transmission power.

FIG. 15 is a sequence diagram when the transmission power in the D2D communication exceeds the maximum transmission power.

As illustrated in FIG. 15, in step S51, the eNB 200 transmits, on a broadcast channel (BCCH), maximum power information indicating maximum transmission power permitted in the D2D communication. Specifically, the eNB 200 puts the maximum power information into a master information block (MIB) or a system information block (SIB) and transmits the MIB or the SIB. When starting the D2D communication, the UE (A) 100-1 and/or the UE (B) 100-2 acquires and stores the maximum power information from the eNB 200.

In step S52, the UE (A) 100-1 and the UE (B) 100-2 perform the D2D communication. Hereinafter, the following description will be given on the assumption that the UE (A) 100-1 detects that the transmission power in the D2D communication exceeds the maximum transmission power.

In step S53, the UE (A) 100-1 notifies the eNB 200 of the fact that the transmission power in the D2D communication exceeds the maximum transmission power. In other words, the UE (A) 100-1 requests the eNB 200 to switch the D2D communication to the cellular communication.

In step S54, the eNB 200 instructs the UE (A) 100-1 and the UE (B) 100-2 to switch the D2D communication to the cellular communication, and performs the assignment of a radio resource for the cellular communication.

In steps S55 and S56, the UE (A) 100-1 and the UE (B) 100-2 switch the D2D communication to the cellular communication.

In accordance with the transmission power control according to the present embodiment, it is possible to appropriately control the transmission power in the D2D communication.

(3.4) Interference Avoidance Operation of D2D Communication (3.4.1) Overview of Operation In the present embodiment, when the D2D communication receives interference from the cellular communication or another D2D communication, the interference is avoided by changing radio resource assignment.

Figure 16:
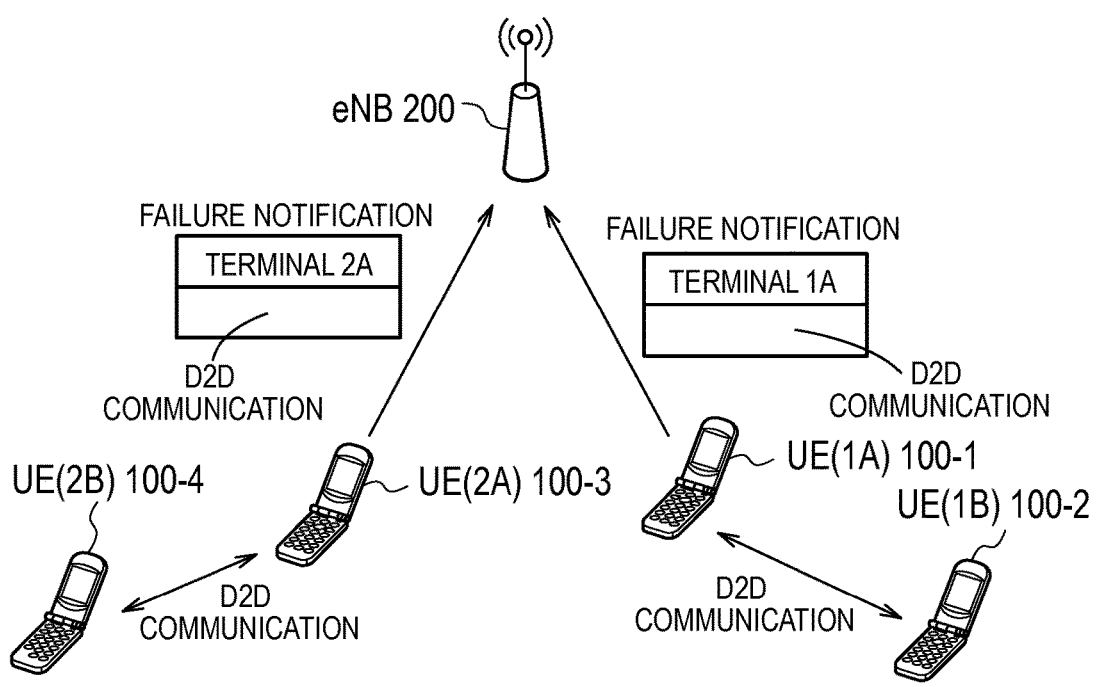
FIG. 16 is a diagram for explaining an interference avoidance operation according to the embodiment (part 1).
Figure 17:
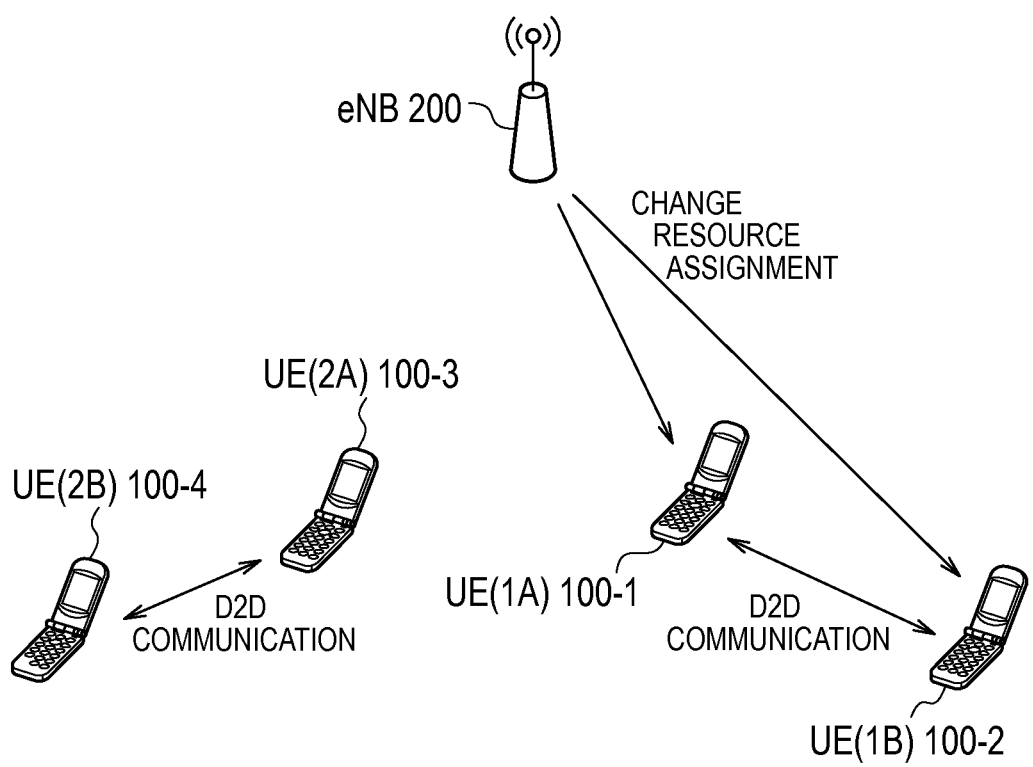
FIG. 17 is a diagram for explaining an interference avoidance operation according to the embodiment (part 2).

FIG. 16 and FIG. 17 are diagrams for explaining an interference avoidance operation according to the present embodiment. In FIG. 16 and FIG. 17, a pair of UE (1A) 100-1 and UE (1B) 100-2 performs the D2D communication and a pair of UE (2A) 100-3 and UE (2B) 100-4 also performs the D2D communication. Furthermore, it is assumed that radio resources used in each D2D communication are equal to each other and receive the influence of interference from each other.

As illustrated in FIG. 16, when a reception failure is detected, the UE (1A) 100-1 transmits a failure notification related to the reception failure during the D2D communication, to the eNB 200. The reception failure indicates failure of reception at a reception timing (specifically, it is not possible to decode received data). The failure notification includes the identifier of the UE (1A) 100-1 and information indicating that the D2D communication is being performed. In addition, when it is possible to receive and decode an interference wave from the other D2D communication pair that is a cause of the reception failure, the UE (A) 100-1 may determine that the other D2D communication pair is an interference source and include information on the other D2D communication pair, in the failure notification.

Furthermore, similarly, when reception failure is detected, the UE (2A) 100-3 also transmits failure notification related to the reception failure during the D2D communication to the eNB 200. The failure notification includes the identifier of the UE (2A) 100-3 and information indicating that the D2D communication is being performed. In addition, when it is possible to receive and decode an interference wave from the other D2D communication pair that is a cause of the reception failure, the UE (2A) 100-3 may determine that the other D2D communication pair is an interference source and include information on the other D2D communication pair, in the failure notification.

When receiving each failure notification from the D2D communication pair including the UE (1A) 100-1 and the UE (1B) 100-2 and the D2D communication pair including the UE (2A) 100-3 and the UE (2B) 100-4, the eNB 200 determines whether each D2D communication pair uses the same radio resource in the D2D communication.

As illustrated in FIG. 17, when it is determined that each D2D communication pair uses the same radio resource in the D2D communication, the eNB 200 determines that each D2D communication pair receives the influence of interference from each other and changes the assignment of the radio resource of one D2D communication pair. For example, the eNB 200 reassigns a different radio resource to the D2D communication pair including the UE (1A) 100-1 and the UE (1B) 100-2. In this way, the interference of the D2D communication is avoided.

(3.4.2) Detailed Operation

As described above, the LTE system according to the present embodiment supports the D2D communication in which radio communication is directly performed between the UE (A) 100-1 and the UE (B) 100-2 in the frequency and the time (the radio resource) assigned from the eNB 200.

When it is assumed that the UE (A) 100-1 is a data transmission side and the UE (B) 100-2 is a data reception side, if the UE (B) 100-2 does not receive data from the UE (A) 100-1 in a time (at a reception timing) in which the data is to be received from the UE (A) 100-1, the UE (B) 100-2 transmits failure notification indicating reception failure in the D2D communication to the eNB 200.

In this way, the eNB 200 is able to recognize a generation status of the reception failure in the D2D communication, thereby taking measures to solve the reception failure. Consequently, it is possible to appropriately control the D2D communication in consideration of the generation status of the reception failure in the D2D communication.

However, according to such a method, when there is no data to be transmitted from the UE (A) 100-1 to the UE (B) 100-2, that is, when a transmission buffer for the D2D communication in the UE (A) 100-1 is empty, since the UE (B) 100-2 is not able to receive the data from the UE (A) 100-1, determination that reception failure has occurred is erroneously made.

As a consequence, even though reception failure (interference) does not actually occur, the eNB 200 performs an unnecessary process such as changing the assignment of a radio resource.

Hereinafter, an operation (the operation patterns 1 and 2) for avoiding such a failure will be described.

(3.4.2.1) Operation Pattern 1

Figure 18:
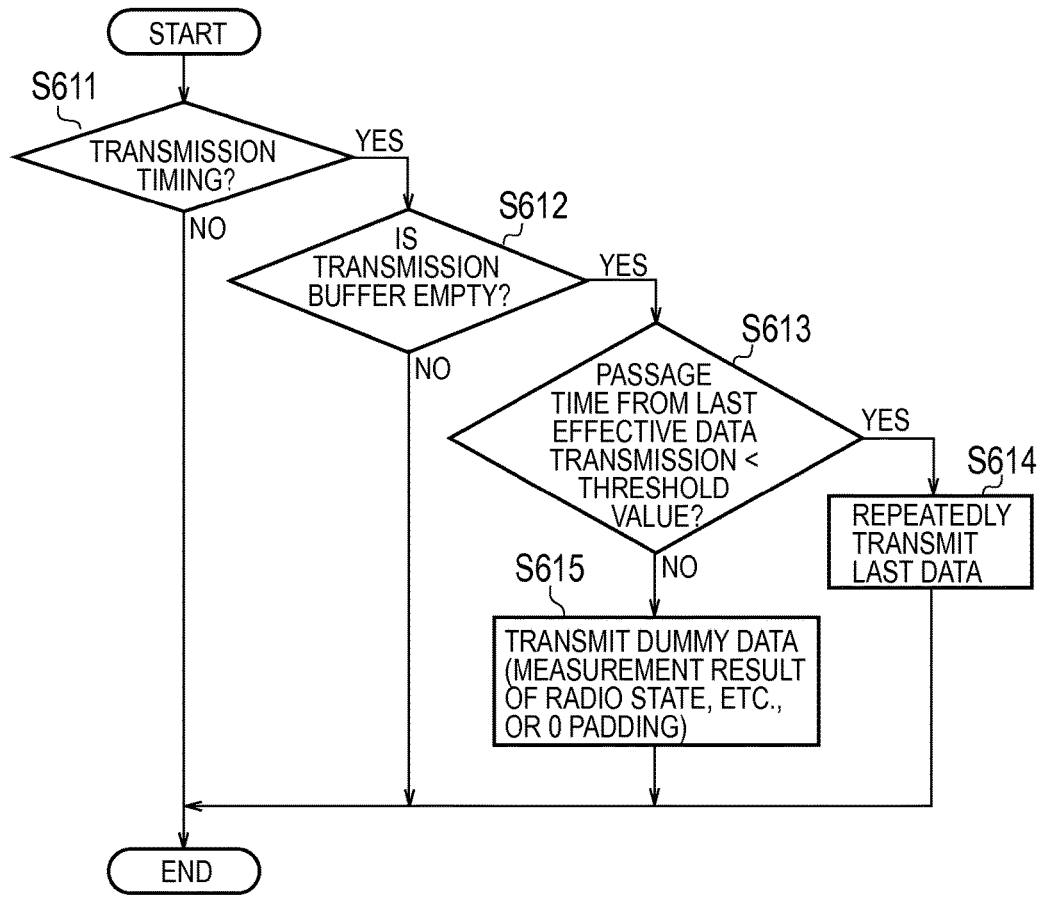
FIG. 18 is a flow diagram of an operation pattern 1 of an interference avoidance operation according to the embodiment.

FIG. 18 is an operation flow diagram of the UE (A) 100-1 in the operation pattern 1. The UE (A) 100-1 repeats the present flow.

As illustrated in FIG. 18, in step S611, the UE (A) 100-1 determines whether a current time is a time in which data is to be transmitted to the UE (B) 100-2.

When a result of the determination in step S611 is "YES", the UE (A) 100-1 determines whether the transmission buffer thereof for the D2D communication is empty in step S612. Note that the transmission buffer for the D2D communication is a buffer that temporarily stores data (user data) to be newly transmitted in the D2D communication. Thus, when the transmission buffer for the D2D communication is empty, it indicates that there is no data to be newly transmitted in the D2D communication.

When a result of the determination in step S612 is "YES", the UE (A) 100-1 determines whether a passage time after data is finally transmitted to the UE (B) 100-2 is smaller than a threshold value in step S613.

When a result of the determination in step S613 is "YES", the UE (A) 100-1 repeatedly transmits the data finally transmitted to the UE (B) 100-2 in step S614. In this way, it is possible to prevent erroneous determination in the UE (B) 100-2, and to improve the reliability of communication by allowing the UE (B) 100-2 to repeatedly receive the same data. For example, the UE (B) 100-2 synthesizes the same data repeatedly received, thereby enhancing a decoding success rate of the data.

Meanwhile, when the result of the determination in step S613 is "NO", the UE (A) 100-1 transmits dummy data to the UE (B) 100-2 in step S615. Furthermore, the dummy data, for example, indicates data, other than user data, such as a measurement result of a radio state or 0 padding. When the result of the determination in step S613 is "NO", that is, when a long time passes after the data is finally transmitted to the UE (B) 100-2, it is meaningless even if the repetitive transmission is performed after that. In this regard, instead of the repetitive transmission, the dummy data is transmitted, so that it is possible to prevent meaningless repetitive transmission.

(3.4.2.2) Operation Pattern 2

Figure 19:
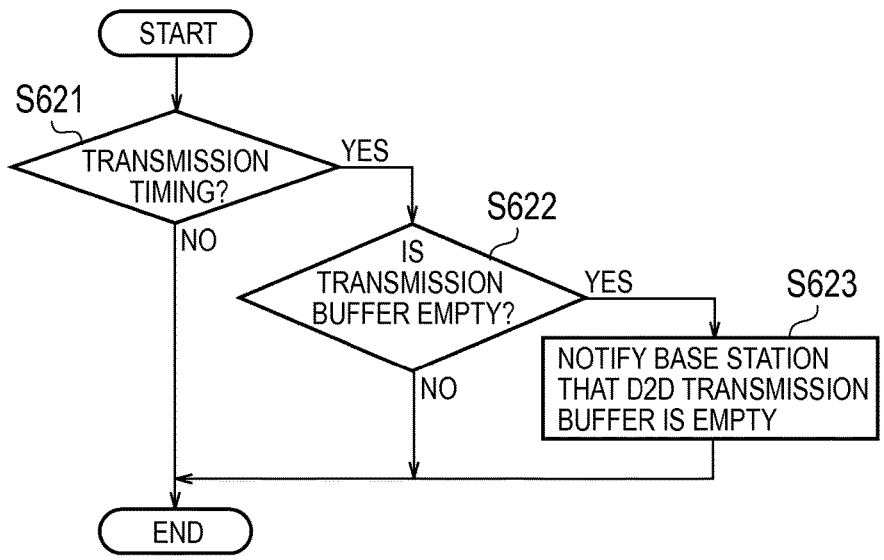
FIG. 19 is a flow diagram of an operation pattern 2 of the interference avoidance operation according to the embodiment.

FIG. 19 is an operation flow diagram of the UE (A) 100-1 in the operation pattern 2. The UE (A) 100-1 repeats the present flow.

As illustrated in FIG. 19, in step S621, the UE (A) 100-1 determines whether a current time is a time in which data is to be transmitted to the UE (B) 100-2.

When a result of the determination in step S621 is "YES", the UE (A) 100-1 determines whether the transmission buffer thereof for the D2D communication is empty in step S622.

When a result of the determination in step S622 is "YES", the UE (A) 100-1 transmits, to the eNB 200, data notification indicating that there is no data to be transmitted to the UE (B) 100-2 (that is, notification indicating that the D2D transmission buffer is empty), in step S623. Note that, as the data notification, the aforementioned BSR for the D2D communication may be used.

FIG. 20 is an operation sequence diagram in the operation pattern 2.

As illustrated in FIG. 20, in step S631, the UE (A) 100-1 transmits data to the UE (B) 100-2 in a time (at a transmission timing) in which the data is to be transmitted to the UE (B) 100-2.

In step S632, the transmission buffer of the UE (A) 100-1 for the D2D communication becomes empty.

In step S633, the UE (A) 100-1 transmits, to the eNB 200, data notification indicating that there is no data to be transmitted to the UE (B) 100-2 (that is, notification indicating that the D2D transmission buffer is empty).

In addition, differently from the operation pattern 1, in the operation pattern 2, when there is no data to be transmitted to the UE (B) 100-2, the UE (A) 100-1 transmits no data to the UE (B) 100-2.

In step S634, the UE (B) 100-2 determines that reception failure has occurred in the D2D communication because no data is received from the UE (A) 100-1 in a time (at a reception timing) in which data is received from the UE (A) 100-1.

In step S635, the UE (B) 100-2 transmits failure notification indicating reception failure in the D2D communication to the eNB 200.

In step S636, the eNB 200 regards that the failure notification from the UE (B) 100-2 is not caused by reception failure because the failure notification is received from the UE (B) 100-2 but the data notification is received from the UE (A) 100-1 in step S633. In other words, the eNB 200 ignores the failure notification from the UE (B) 100-2.

As described above, after the eNB 200 receives the data notification from the UE (A) 100-1, when the eNB 200 receives the failure notification from the UE (B) 100-2, the eNB 200 ignores the failure notification from the UE (B) 100-2. In this way, it is possible to prevent determination that reception failure has occurred from being erroneously made in the eNB 200.

Other Embodiments

It should not be understood that those descriptions and drawings constituting a part of the present disclosure limit the present disclosure. Further, various substitutions, examples, or operational techniques shall be apparent to a person skilled in the art on the basis of this disclosure.

In the aforementioned embodiment, an entity determining whether the D2D communication is possible is the MME/S-GW 300. However, the eNB 200 may determine whether the D2D communication is possible.

In the aforementioned embodiment, an entity determining the method of assigning radio resource is the eNB 200. However, the MME/S-GW 300 may determine the method of assigning radio resource and notify the eNB 200 of a result of the determination. Furthermore, the aforementioned embodiment has described an example of determining the method of assigning radio resource on the basis of the identifier of an application. However, instead of the identifier of the application, an identifier of communication quality (that is, QoS) required for the application may be used. Such an identifier of the QoS is called QCI (QoS Class Identifier).

In the aforementioned embodiment, the eNB 200 transmits, on the broadcast channel (BCCH), the maximum power information indicating the maximum transmission power permitted in the D2D communication. However, the maximum power information may be individually transmitted to the UE 100. In this case, it is preferable that the eNB 200 determines the maximum transmission power permitted in the D2D communication in response to propagation loss between the eNB 200 and the UE 100. For example, as the propagation loss between the eNB 200 and the UE 100 is small, the eNB 200 determines the maximum transmission power permitted in the D2D communication to be small.

In addition, the entire contents of U.S. Provisional Application No. 61/656,194 (filed on Jun. 6, 2012) and U.S. Provisional Application No. 61/693,993 (filed on Aug. 28, 2012) are incorporated in the present specification by reference.

INDUSTRIAL APPLICABILITY

As described above, the present disclosure is able to appropriately control the D2D communication, and thus is available for a radio communication field such as cellular mobile communication.

The invention claimed is:

1. A radio base station, comprising:
    a transmitter;
    a receiver; and
    a controller configured to control the transmitter and the receiver, wherein
    the receiver is configured to receive, from a user terminal, first information indicating an identifier for the radio base station to recognize traffic characteristics in a Proximity Service communication, wherein the Proximity Service communication does not pass through a network and is performed between terminals, and
    the transmitter is configured to transmit second information, which indicates periodic radio resources for using the Proximity Service communication, to the user terminal having transmitted the first information.

2. The radio base station according to claim 1, wherein, the controller is configured to determine whether or not to allocate the periodic radio resources to the user terminal, on a basis of the traffic characteristics indicated by first information.

3. The radio base station according to claim 1, wherein the controller is configured to recognize traffic load in the Proximity Service communication on a basis of the first information.

4. The radio base station according to claim 1 wherein, the controller is configured to allocate the periodic radio resources to the user terminal by use of the first information.

5. The radio base station according to claim 1 wherein, the controller is configured to allocate radio resources different from the periodic resources to the user terminal if the controller does not allocate the periodic resources, wherein the allocated radio resources are to be used by the user terminal for the Proximity Service communication.

6. The radio base station according to claim 1, wherein the controller is configured to recognize the traffic characteristics on a basis of the first information received from the user terminal.

7. A user terminal, comprising:
a receiver;
a transmitter; and
a controller configured to control the receiver and the transmitter; wherein
the transmitter is configured to transmit, to a base station, first information indicating an identifier for the radio base station to recognize traffic characteristics in a Proximity Service communication, wherein the Proximity Service communication does not pass through a network and is performed between terminals, and
the receiver is configured to receive, from the base station, second information, which indicates periodic radio resources for using the Proximity Service communication, to the user terminal.

8. The user terminal according to claim 7, wherein the controller is configured to control to receive information indicating ACK or NACK for data, which was transmitted from the user terminal, from another user terminal.

9. A processor for controlling a radio base station, comprising:
a memory, wherein
the processor is configured to:
receive, from the user terminal, first information indicating an identifier for the radio base station to recognize traffic characteristics in a Proximity Service communication, wherein the Proximity Service communication does not pass through a network and is performed between terminals; and
transmit second information, which indicates periodic radio resources for using the Proximity Service communication, to the user terminal having transmitted the first information.

10. The processor according to claim 9, wherein the processor is configured to recognize the traffic characteristics on a basis of the first information received from the user terminal.

11. A processor for controlling a user terminal, comprising a memory, wherein
the processor is configured to:
transmit, to a base station, first information indicating an identifier for the radio base station to recognize traffic characteristics in a Proximity Service communication, wherein the Proximity Service communication does not pass through a network and is performed between terminals; and
receive second information, which indicates periodic radio resources for using the Proximity Service communication, to the user terminal.

12. The processor according to claim 11, wherein the processor is configured to control to receive information indicating ACK or NACK for data, which was transmitted from the user terminal, from another user terminal.

* * * * *